US007131071B2

(12) United States Patent
Gune et al.

(10) Patent No.: US 7,131,071 B2
(45) Date of Patent: Oct. 31, 2006

(54) DEFINING AN APPROVAL PROCESS FOR REQUESTS FOR APPROVAL

(75) Inventors: Prasad Gune, San Francisco, CA (US); Anthony Deighton, San Francisco, CA (US); Mingte Chen, Fremont, CA (US); Richard Kuo, San Mateo, CA (US); Wister Walcott, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 502 days.

(21) Appl. No.: 10/109,973

(22) Filed: Mar. 29, 2002

(65) Prior Publication Data

US 2003/0189600 A1 Oct. 9, 2003

(51) Int. Cl.
G06F 3/048 (2006.01)
G06F 19/00 (2006.01)
G06F 15/163 (2006.01)

(52) U.S. Cl. ............... 715/769; 715/967; 715/971; 715/751; 705/8; 705/9; 717/113; 717/103; 717/102

(58) Field of Classification Search ............... 715/769, 715/770, 967, 751, 755, 971, 762, 779, 853, 715/759; 705/1, 7, 8, 9; 707/10, 104.1; 717/100, 101, 102, 103, 104, 105, 108, 109, 717/113, 116, 120
See application file for complete search history.

(56) References Cited

U.S. PATENT DOCUMENTS

| 5,481,740 A | 1/1996 | Kodosky ............... 715/839 |
| 5,710,921 A | 1/1998 | Hirose ................. 395/676 |
| 5,831,611 A | 11/1998 | Kennedy et al. ........... 715/763 |
| 5,870,712 A | 2/1999 | Kiuchi et al. .............. 705/8 |
| 6,041,306 A | 3/2000 | Du et al. .................. 705/8 |
| 6,115,646 A | 9/2000 | Fiszman et al. .......... 700/181 |
| 6,311,192 B1 | 10/2001 | Rosenthal et al. ........ 707/200 |
| 6,996,601 B1* | 2/2006 | Smith .................. 715/762 X |
| 2001/0049705 A1 | 12/2001 | Murase et al. ........... 707/530 |
| 2002/0002481 A1 | 1/2002 | Uchio et al. .............. 705/9 |
| 2002/0019836 A1 | 2/2002 | Uchio et al. ............ 707/511 |
| 2002/0032596 A1 | 3/2002 | Ohsaki et al. ............. 705/9 |
| 2003/0033167 A1* | 2/2003 | Arroyo et al. ............. 705/1 |
| 2003/0135403 A1* | 7/2003 | Sanderson et al. ......... 705/8 |

FOREIGN PATENT DOCUMENTS

| EP | 0703539 | 3/1996 |
| EP | 0774725 | 5/1997 |
| EP | 0953929 | 11/1999 |
| EP | 1065617 | 1/2001 |
| WO | WO-01/71621 | 9/2001 |

OTHER PUBLICATIONS

European Search Report for European Application EP 03 70 9081, transmitted Apr. 6, 2006, 3 pages.

* cited by examiner

Primary Examiner—Raymond J. Bayerl
(74) Attorney, Agent, or Firm—Campbell Stephenson Ascolese LLP

(57) ABSTRACT

A facility for defining a process for approving requests for approval of a selected type is described. The facility displays a palette containing visual representations of each of a plurality of approval process elements. The facility then receives a number of user input instances, each user input instance dragging one of the visual representations into a selected location in a workspace, so as to form an arrangement of approval process elements. The facility then stores a process definition corresponding to the formed arrangement of approval process elements.

15 Claims, 21 Drawing Sheets

| Persons | | | | | |
|---|---|---|---|---|---|
| Query | | | | | Go |
| Emp # | Last Name | First Name | Job Title | Work Phone # | Position |
| 1155 | Aaron | Willie | Manager, PR | 212-555-1234 | Manager, Public |
| 2345 | Abraham | John | Consultant | 213-555-1212 | Consultant |
| 35678 | Ackerman | David | Senior Director | 310-555-1212 | Senior Director |
| | | | | OK | Cancel |

*Fig. 14*

DEFINING AN APPROVAL PROCESS FOR REQUESTS FOR APPROVAL

TECHNICAL FIELD

The present invention is directed to the field of office automation, and, more particularly, to the field of processing requests for approval.

BACKGROUND

Many business organizations utilize approval processes that identify cases in which one member of the organization (the "requester") must submit a request for approval by one or more additional members of the organization ("approvers"). For example, an organization's approval process may require certain members of the organization to obtain approval from their manager, then their manager's manager each time they submit a time sheet recording the hours that they have worked. Typical approval processes may require members of the organization to submit such a request in a variety of other circumstances, such as the following: expense reports, time sheets, time off requests, objectives & reviews, hires, promotions, training requests, incentive compensation requests, contracts, purchase orders, quotes, press releases, and content for web posting.

In a typical organization, some of these types of approval requests are generated manually by the requester, then forwarded on paper or via electronic mail to the appropriate sequence of approvers. For example, transfer requests may be manually generated by requesters, then forwarded to necessary approvers. In such cases, each member of the organization participating in the approval process (the requester and all approvers) must fully understand the approval process specified for requests of this type, and route the request in accordance with this process. For example, a requester generating a transfer request must know that the request must be routed to his or her manager, and so route the request. The requester's manager must approve the request, know that the request must be routed to his or her manager, and so route the request. The requester's manager's manager must approve the request, know that the request must be routed to a particular administrator for further action, and so route the request. This approach requires a significant level of process knowledge and participation by all members involved in the approval process.

Certain types of approval requests may be generated using one of a number of different application programs. For example, a time sheet application may be used to generate time sheets and automatically route them through an approval process, while a separate purchase order application is used to generate purchase orders and automatically route them through an approval process. In such cases, in order for these requests to be automatically routed in this way, one or more approval processes must be created for each application. Such creation is in many cases difficult. For example, the person creating the approval process may be required to write a computer program that implements the approval process in a general-purpose programming language. Further, once an approval process is created for one application, it must be re-created for each additional application with which it is to be used. This may require significant additional effort, as the creation process often varies significantly between applications. In the above example, for instance, the person creating an approval process for the time sheet application may be required to re-create that approval process for the purchase order application.

In view of the substantial shortcomings of the conventional approaches to routing approval requests discussed above, a more effective and user-friendly approach would have significant utility.

BRIEF DESCRIPTION OF THE DRAWINGS

FIGS. 12–18 are display diagrams showing further user interface features of the facility for displaying and/or editing information associated with the gate approval process element instances whose creation is shown in FIG. 11.

DETAILED DESCRIPTION

I. Introduction

A software facility for defining an approval process for approval requests ("the facility") is described. Embodiments of the facility provide a visual interface that can be used by an approval administrator or other user to define an approval process for approval requests of a selected type, such as requests to approve timesheets. The user interface includes a palette of pictorial representations of each of a number of different approval process elements. For example, the palette may include visual representations of a starting point at which a request is submitted for approval; logical conditions that determine how a request is routed; approval decisions by individual approvers or groups of approvers; logical operators that control collaborative approval decisions; an ending point at which a request is determined to be approved; and connectors for connecting other approval process elements in an approval process flow. The user drags visual representations from the palette into particular relative positions in a workspace, where their arrangement forms a pictorial representation of the approval process. The facility enables the user to save the corresponding approval process for use in processing each approval request of the selected type.

In some embodiments, the facility enables users to define approval processes in which a request may be acted upon by any of a group of alternative approvers. The facility can be used to define an approval process in which a request is presented simultaneously to a group of two or more approvers. As soon as one of these approvers approves or rejects the request, it is approved or rejected on behalf of the entire group, and ceases to be presented to any of the other members of the group.

In some embodiments, the facility enables a new approval process to be "templated" from an existing approval process. To do so, the facility creates a copy of the existing approval process, and permits the user to modify the corresponding pictorial representation. The approval process corresponding to the modified pictorial representation may then be saved process for use in processing each approval request of a different type.

By enabling users to define approval processes in the ways discussed above, embodiments of the facility significantly streamline this task, allowing it to be completed quickly and effectively by individuals with no special training.

II. System Overview and Overall Architecture

Figure 1:
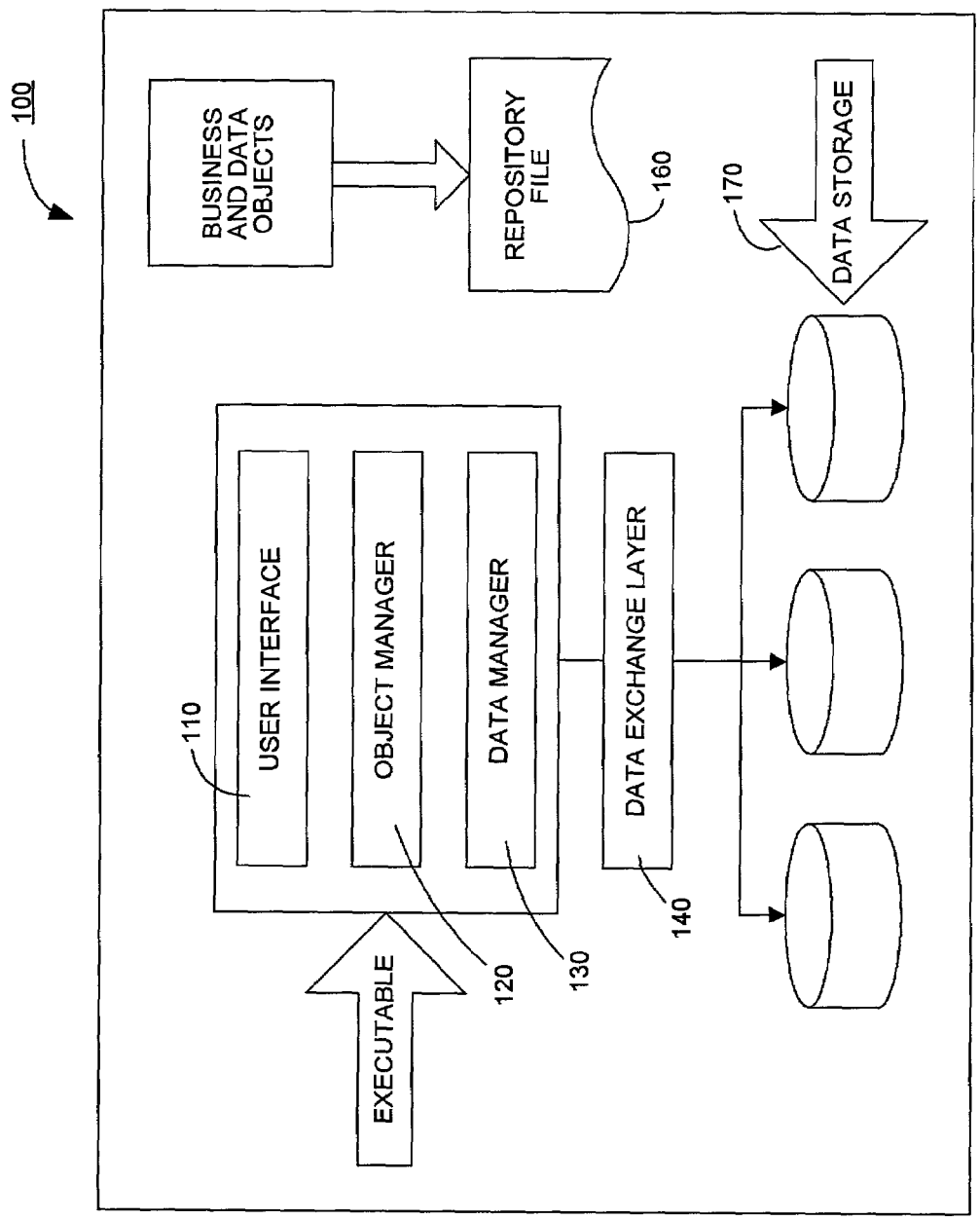
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

Figure 2:
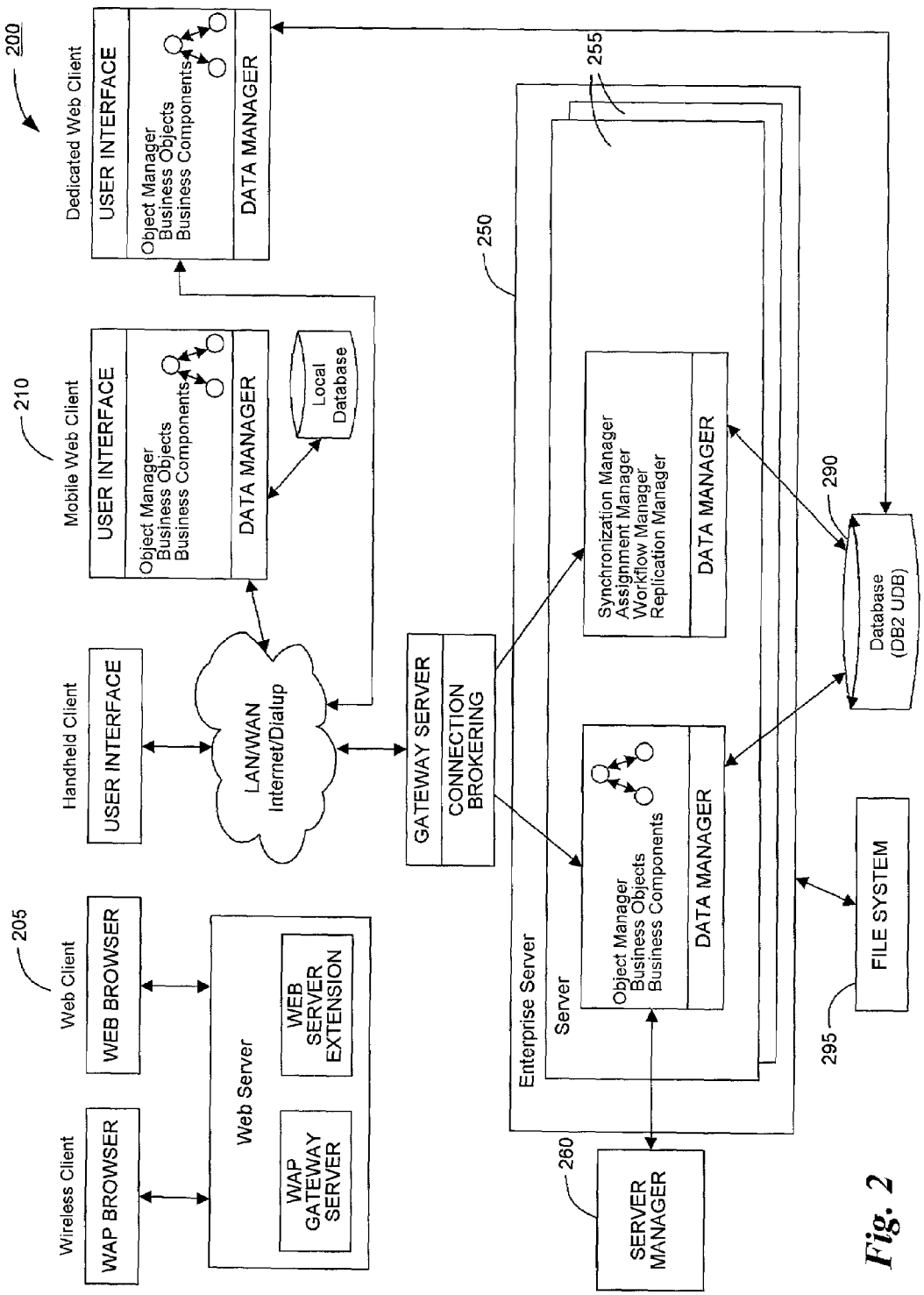
FIG. 2 shows a block diagram of one embodiment of a system configuration in which the teachings of the present invention are implemented.

In one embodiment, the data exchange layer is designed to handle the interactions with one or more specific target databases and provide the interface between the data manager layer 130 and the underlying data sources. FIG. 2 shows a block diagram of one embodiment of a system configuration in which the teachings of the present invention are implemented.

In one embodiment, the multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile web clients can have additional remote databases (also called local databases). In one embodiment, unless the remote or local databases associated with the mobile web clients are defined as read-only databases, these mobile web clients can create and update data locally that will be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, dedicated web clients and server components, including those that operate in conjunction with the other types of clients, can connect directly to the database 290 and make changes in real time. In one embodiment, mobile web clients can download a subset of the server's data to use locally, and periodically synchronize with the server database through the system server to update both the local and the server database.

In one embodiment, various tables included in the database 290 may be logically organized into the following types: data tables, interface tables, and repository tables, etc.

In one embodiment, data tables may be used to store user business data, administrative data, seed data, and transaction data, etc. In one embodiment, these data tables may be populated and updated through the various applications and processes. In one embodiment, data tables may include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:

The client application configuration

The mapping used for importing and exporting data

Rules for transferring data to mobile clients

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated web clients can read and write files directly to and from the file system 295. In one embodiment, mobile web clients can have a local file system, which they synchronize with the server-based file system 290 periodically. In one embodiment, other types of client such as the wireless clients and the web clients can access the file system 290 via the system server.

In one embodiment, the enterprise server 250 is a logical grouping of the system servers 255 that share a common table owner or a database, point to a common gateway Server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system may include the following clients: dedicated web clients, mobile web clients, web clients, wireless clients, and handheld clients, etc.

In one embodiment, dedicated web clients (also called connected clients) are connected directly to a database server for data access via a LAN or WAN connection. In one embodiment, these connected or dedicated web clients do not store data locally. These dedicated web clients can also access the file system directly. In one embodiment, the user interface, the object manager, and the data manager layers of the multi-layered architecture reside on the dedicated web client.

In one embodiment, the mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

In one embodiment, a web client runs in a standard browser format from the client's machine. In one embodiment, the web client can connect to a system server 255 through a web server. In one embodiment, the system server 255 is designed and configured to execute business logic and access data from the database 290 and file system 295. In one embodiment, the web client described herein is designed and configured in accordance with the teachings of the present invention to operate in an interactive mode. In one embodiment, the interactive web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc. The web client is described in more details below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more details below with references to various structures, databases, tables, file systems, etc. as illustrating examples.

Figure 3:
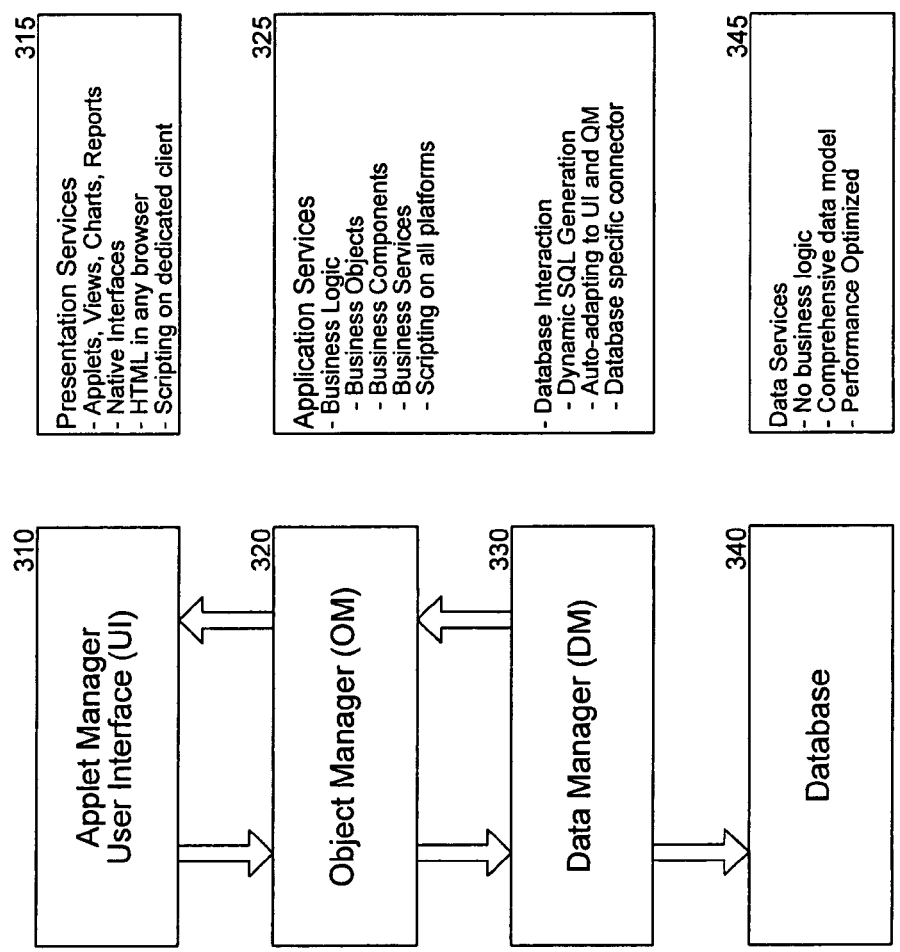
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed and to support the various applications. In one embodiment, these various services may include presentation services logic layer 315 which corresponds to an applet manager and user interface layer 310, application services logical layer 325 which corresponds to an object manager (OM) layer 320 and a data manager (DM) layer 330, and data services logical layer 345 which corresponds to a database layer 340.

In one embodiment, the presentation services 315 may be designed and configured to support various types of clients and may provide them with user interface applets, views, charts, and reports, etc. As described above, a large variety of clients may be supported including wireless clients, handheld clients, web clients, mobile web clients, and dedicated (connected) clients, etc.

In one embodiment, the application services 325 may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries, etc.) necessary to satisfy the request. For example, the data interaction services may be used to translate a call for data into DBMS-specific SQL statements.

In one embodiment, data storage services 345 may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
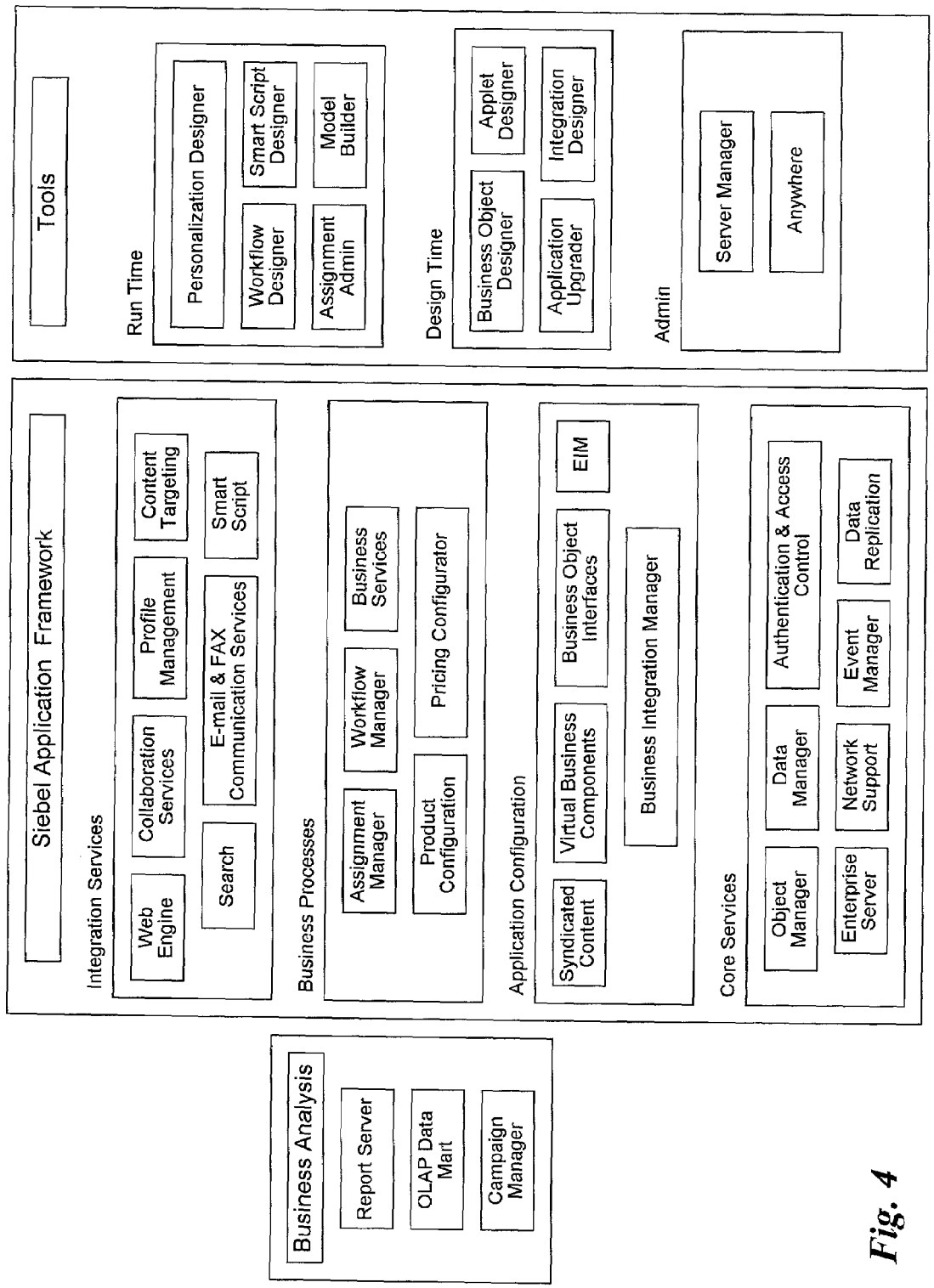
FIG. 4 illustrates a block diagram of one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

The enterprise server, which is the middle-tier application server

The networks that link all of these pieces together

Facilities like event manager and data replication, which allow sharing data between multiple installations of various applications as well as between the various applications and other external applications The authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server having information requested from it.

In one embodiment, business processes services are designed and configured to allow the client to automate business processes through the application. In one embodiment, these various business process services may include the following:

Assignment of tasks through Assignment Manager

Enforcement of business practices through Workflow Manager

Reuse of custom business logic through Business Services

Ensuring proper product configuration and pricing through the Product Configurator and Pricing Configurator In one embodiment, creation of these business processes can be done through Run-Time tools such as Personalization Designer, Workflow Designer, SmartScript Designer, Assignment Administration Views, and the Model Builder, etc.

In one embodiment, integration services may be designed and configured to provide the client with user interface and thin client support. In one embodiment, these may include capabilities for building and maintaining web-based applications, providing web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured provide one place to monitor and administer the application environment. In one embodiment, these services allow the user to administer the application either through a graphic user interface (GUI) or from a command line, etc.

III. Facility and Its Implementation

To further describe the facility, its implementation and operation is discussed hereafter in conjunction with a number of sample display diagrams.

Figure 5:
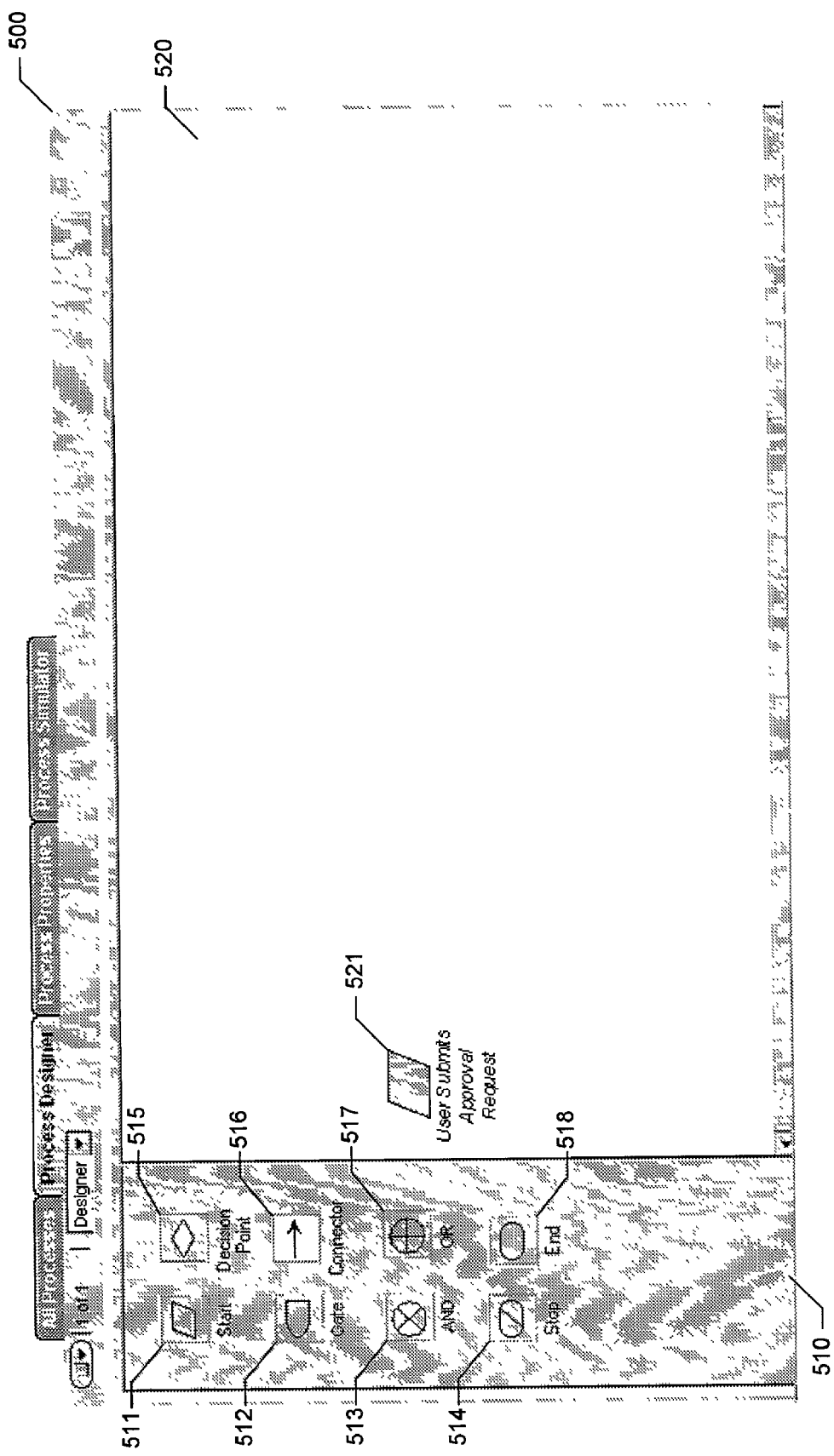
FIG. 5 is a display diagram showing the first in a sequence of typical displays depicting the act of defining a request approval process using the facility.

FIG. 5 is a display diagram showing the first in a sequence of typical displays depicting the act of defining a request approval process using the facility. FIG. 5 shows an approval process definition window 500 displayed by the facility. The request approval process definition window 500 is divided into a palette subwindow 510 and a workspace subwindow 520. The palette 510 contains icons 511–518, each corresponding to a different element used to construct request approval processes. The set of approval process element icons shown in palette 510 is merely exemplary; those of ordinary skill in the art will appreciate that different sets of icons could be displayed, including icons each having the same significance as one of the icons shown, but a different appearance, and/or icons having a different significance.

The workspace 520 is where the user constructs a pictorial representation of the approval process that the user is defining. In order to add approval process elements to the pictorial representation of the approval process being defined, the user drags the corresponding icon from the palette into a desired position in the workspace. FIG. 5 shows that the user has dragged a visual representation 511 of a start approval process element into the workspace to create an approval process element instance 521. This represents the starting point in the request approval process, when the request is submitted by the user seeking its approval.

Figure 6:
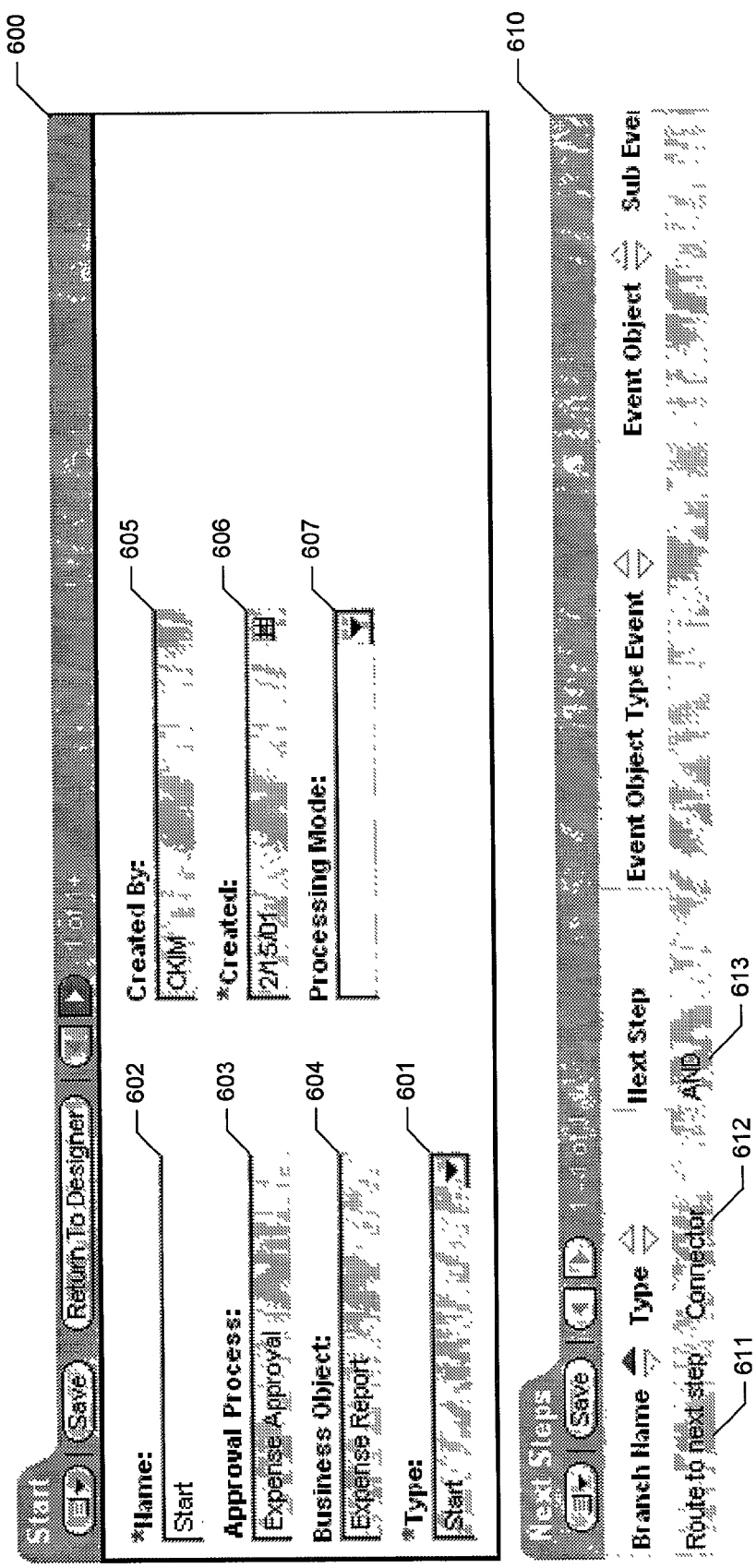
FIG. 6 is a display diagram showing further user interface features of the facility for displaying and/or editing information associated with the start approval process element instance whose creation is show in FIG. 5.

FIG. 6 is a display diagram showing further user interface features of the facility for displaying and/or editing information associated with the start approval process element instance whose creation is shown in FIG. 5. Window 600 shows various attributes of the element instance itself, including its type 601, name 602, approval process 603, corresponding business object 604, creator identity 605, creation date 606, and processing mode 607. The second window 610 contains information describing the subsequent element instance or element instances to which the process passes after this element instance. Information items 611-613 show the element instance 521 being connected to an AND approval process element instance. The information shown in window 610 is typically determined and stored in conjunction with element instance 521 only after the next element instance or element instances in the process are created in the workspace. In this example, the specific information shown in window 610 is created and stored after the user has performed the interactions reflected in FIG. 7, described below.

Figure 7:
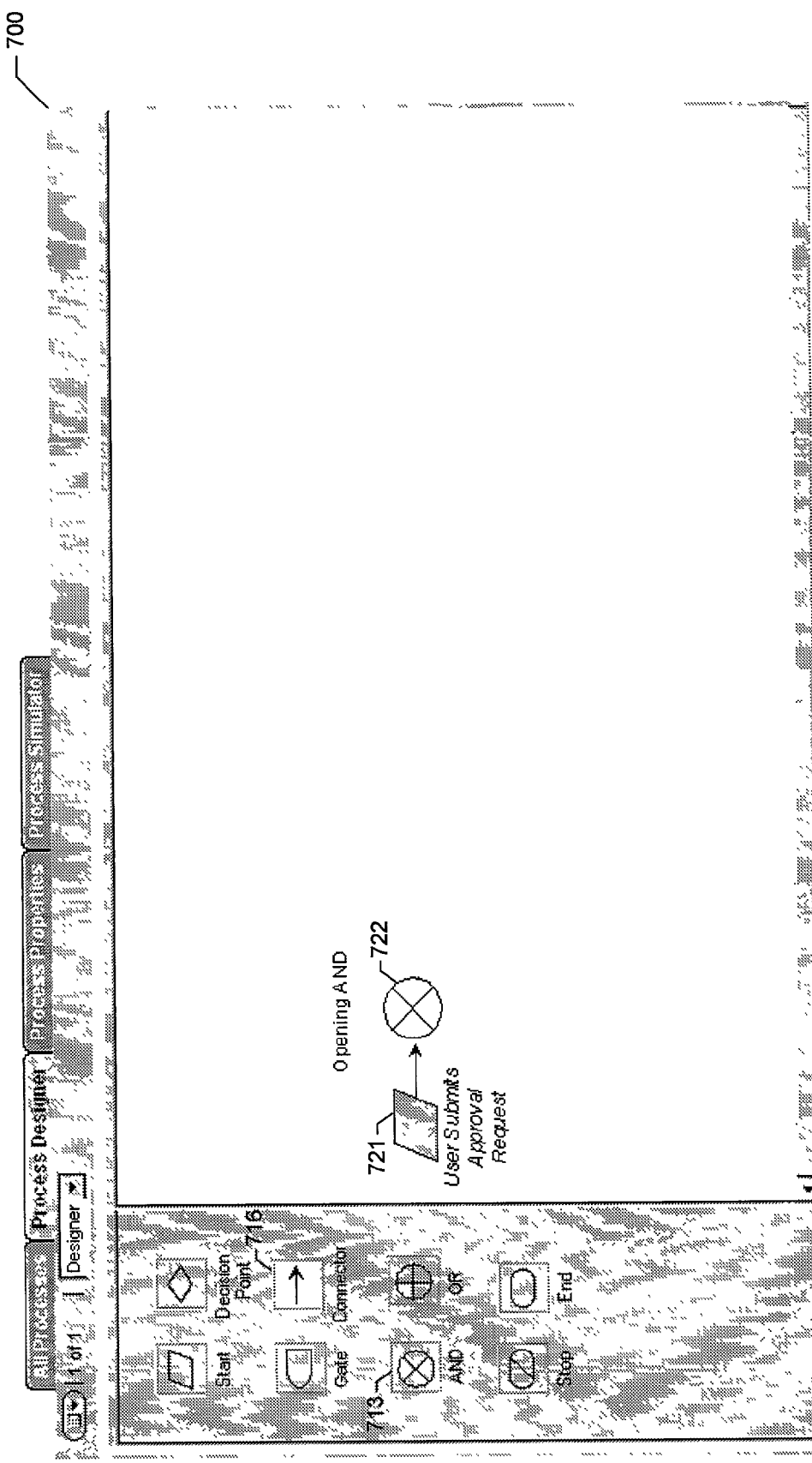
FIG. 7 is a display diagram showing the second in a sequence of typical displays depicting the act of defining a request approval process using the facility.

FIG. 7 is a display diagram showing the second in a sequence of typical displays depicting the act of defining a request approval process using the facility. FIG. 7 shows the result of dragging icons 716 and 713 into the workspace to create an AND approval process element instance 722 following the start approval process element instance 721 in the request approval process being defined. The AND approval process element splits the approval process into two or more parallel paths, each of which is typically pursued simultaneously, and all of which must be satisfied in order for the request to ultimately be approved.

Figure 8:
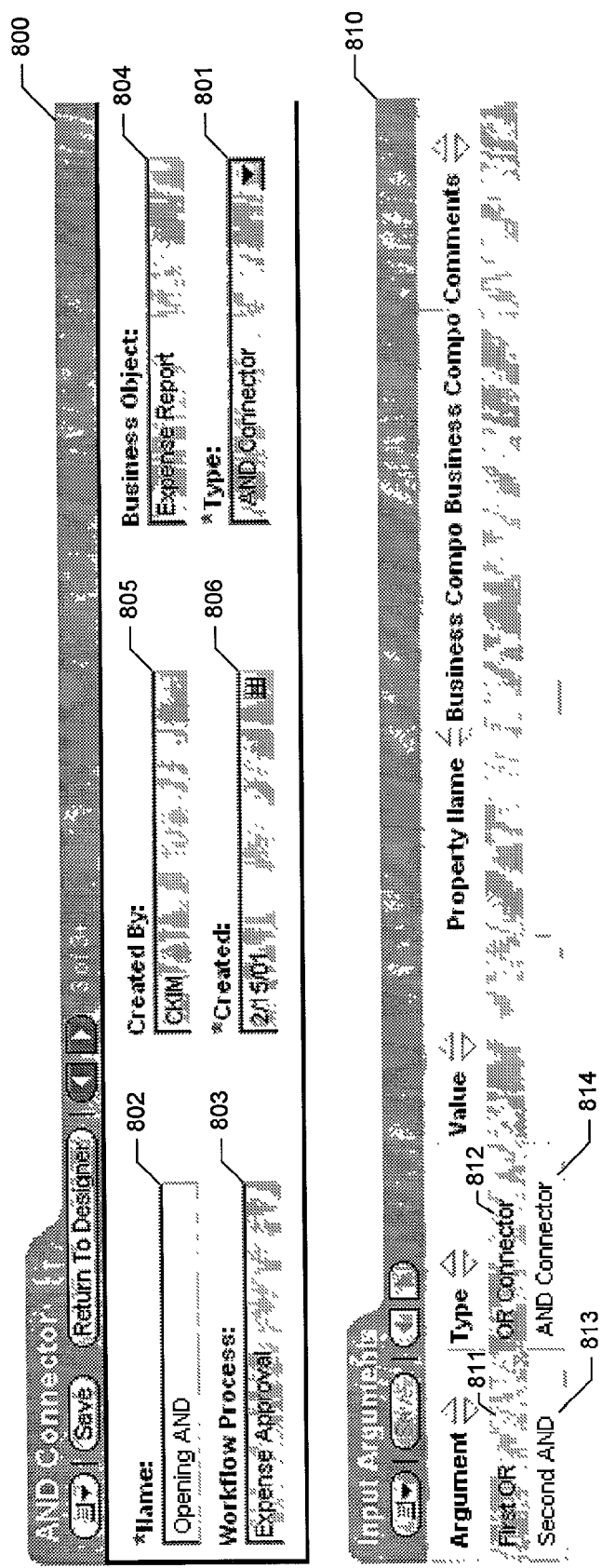
FIG. 8 is display diagram showing further user interface features of the facility for displaying and/or editing information associated with the AND approval process element instance whose creation is shown in FIG. 7.

FIG. 8 is display diagram showing further user interface features of the facility for displaying and/or editing information associated with the AND approval process element instance whose creation is shown in FIG. 7. Window 800 shows various attributes of the element instance itself, while window 810 contains information describing the subsequent element instance or element instances to which the process passes after this element instance.

Figure 9:
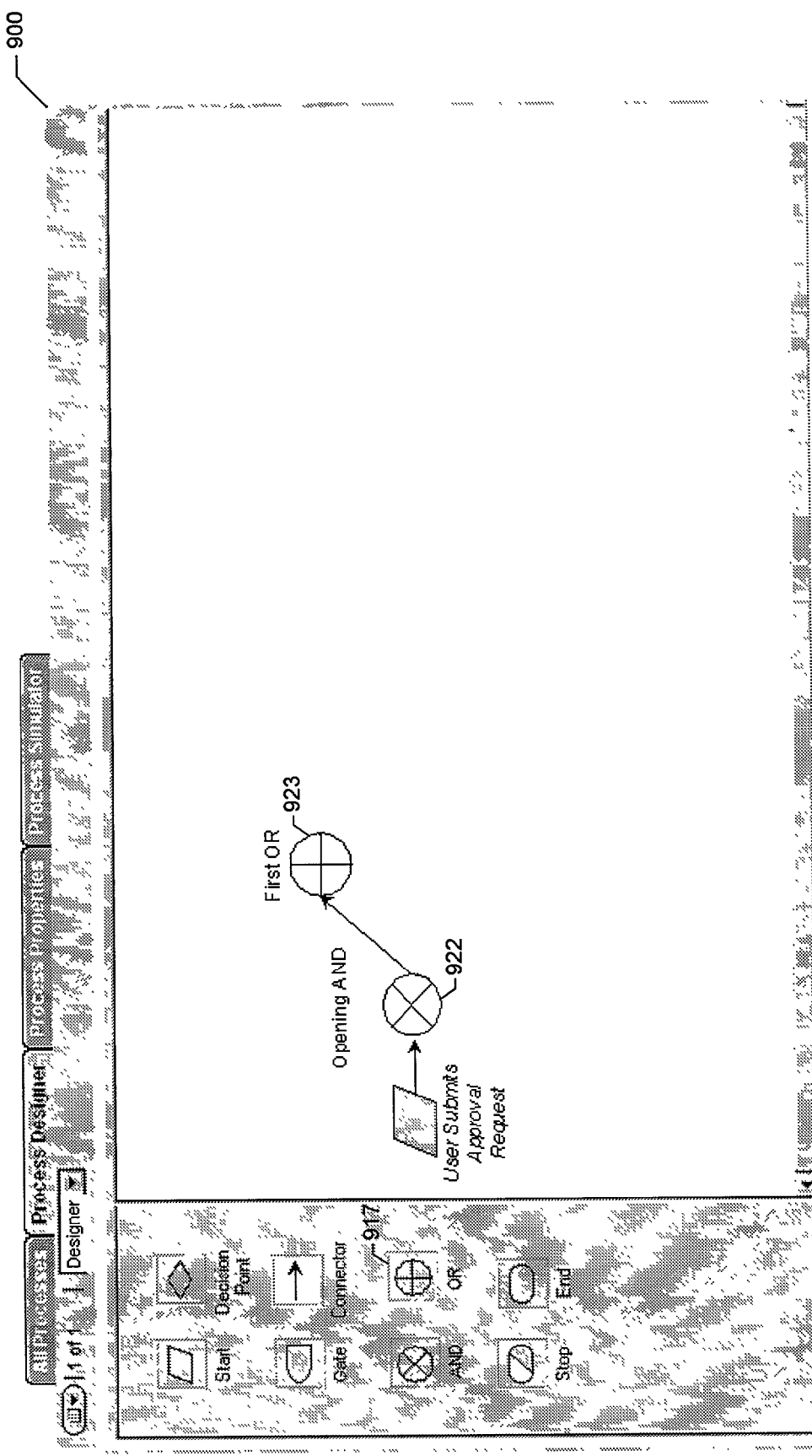
FIG. 9 is a display diagram showing the third in a sequence of typical displays depicting the act of defining a request approval process using the facility.

FIG. 9 is a display diagram showing the third in a sequence of typical displays depicting the act of defining a request approval process using the facility. FIG. 9 shows the result of dragging icon 917 into the workspace to create an OR approval process element instance 923 following the AND approval process element instance 922 in the request approval process being defined. The OR approval process element splits the approval process into two or more parallel paths, each of which is typically pursued simultaneously, and at least one of which must be satisfied in order for the request to ultimately be approved.

Figure 10:
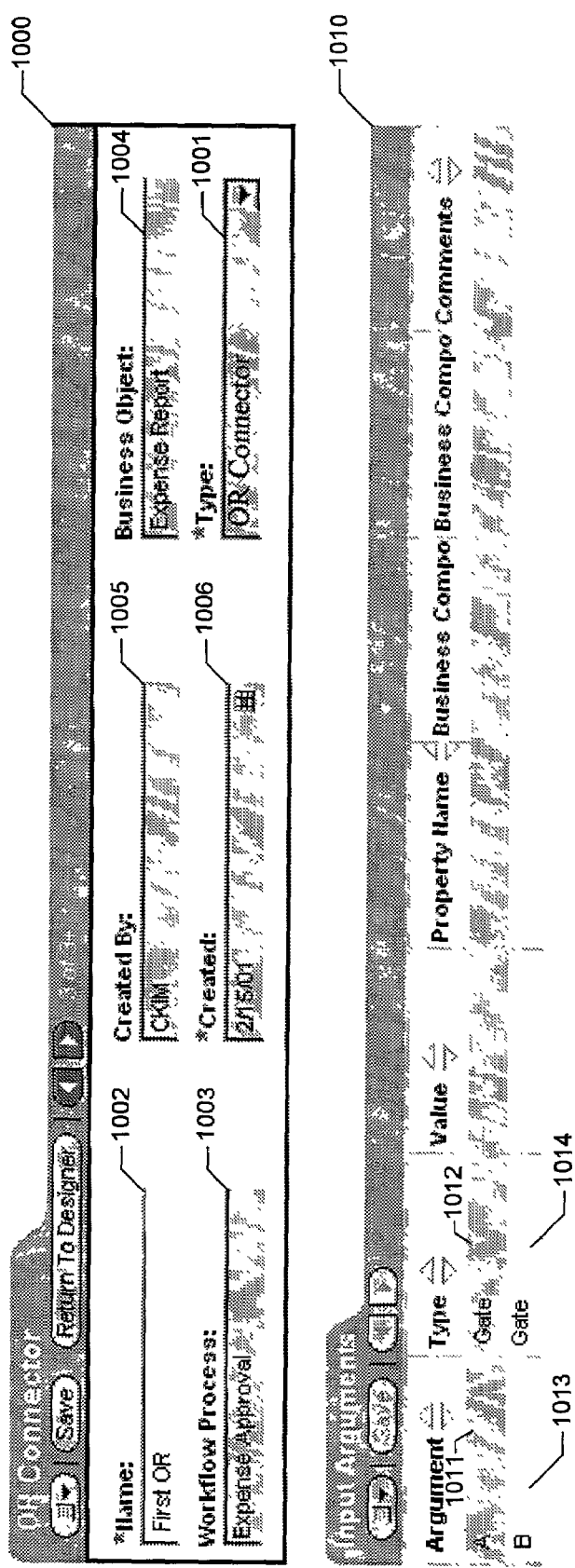
FIG. 10 is a display diagram showing further user interface features of the facility for displaying and/or editing information associated with the OR approval process element instance whose creation is shown in FIG. 9.

FIG. 10 is a display diagram showing further user interface features of the facility for displaying and/or editing information associated with the OR approval process element instance whose creation is shown in FIG. 9. Window 1000 shows various attributes of the element instance itself, while window 1010 contains information describing the subsequent element instance or element instances to which the process passes after this element instance.

Figure 11:
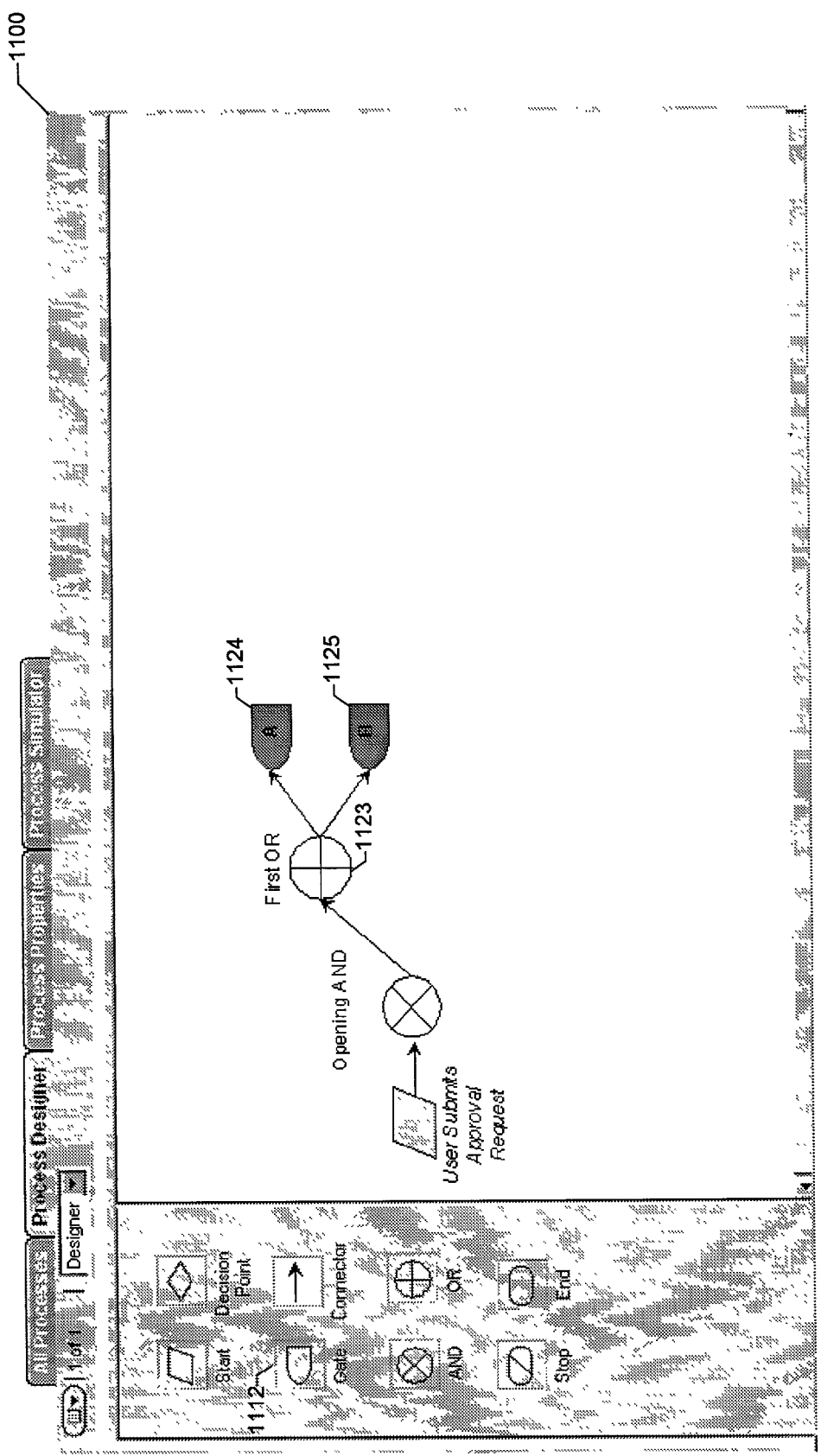
FIG. 11 is a display diagram showing the fourth in a sequence of typical displays depicting the act of defining a request approval process using the facility.
Figure 12:
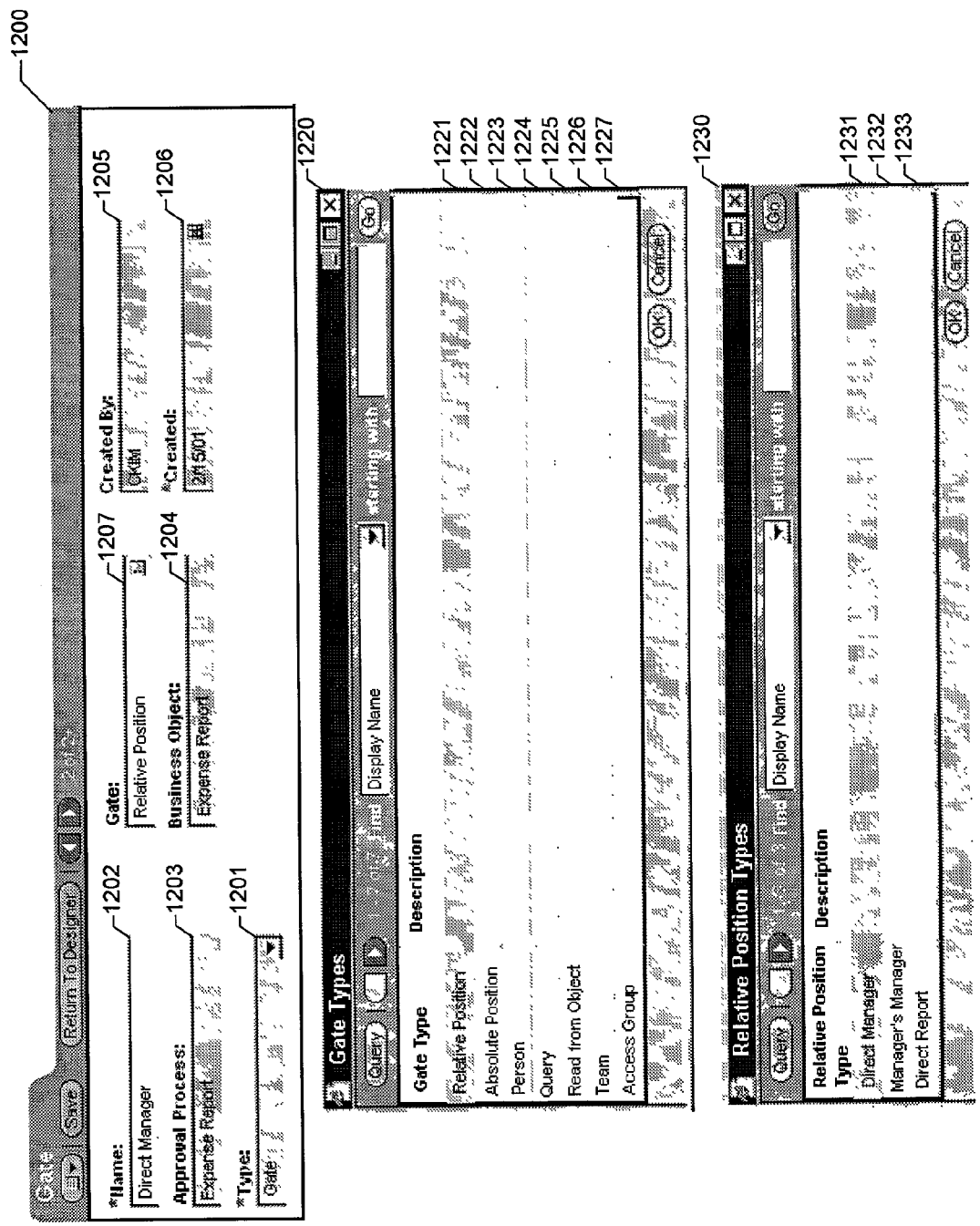

FIG. 11 is a display diagram showing the fourth in a sequence of typical displays depicting the act of defining a request approval process using the facility. FIG. 11 shows the result of dragging icon 1112 into the workspace to create two gate approval process element instances 1124 and 1125 following the OR approval process element instance 1123. Each gate approval process element specifies approval by one or more approvers. Such approval may be obtained from approvers in a variety of ways, including displaying information about the request as part of an approvals inbox displayed to each approver, as is more fully described in U.S. patent application Ser. No. 10/112,415, which is hereby incorporated by reference in its entirety.

FIGS. 12–18 are display diagrams showing further user interface features of the facility for displaying and/or editing information associated with the gate approval process element instances whose creation is shown in FIG. 11. Window 1200 shows various attributes of the element instance itself including a gate type 1207 assigned to the gate approval process element instance. Window 1220 shows a list of possible gate types from which the user may select, including relative position gate type 1221, absolute position gate type 1222, person gate type 1223, query gate type 1224, read from object gate type 1225, team gate type 1226, and access group gate type 1227. Each of these gate types is discussed in greater detail below.

A relative position gate specifies an approver based upon the approver's position relative to the creator of the request. Window 1230 shows sample relative positions that may be selected for a relative position gate, including a direct manager relative position 1231, a manager's manager relative position 1232, and a direct report relative position 1233.

Figure 13:
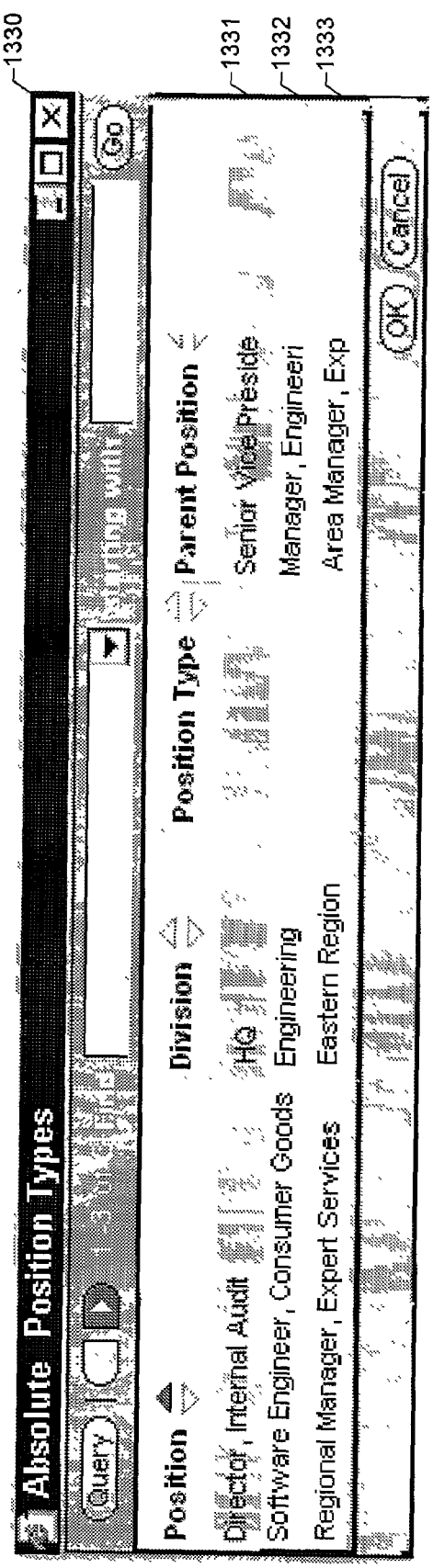

An absolute position gate specifies an approver based upon the approver's absolute position in the organization. Window 1330 in FIG. 13 shows a number of sample absolute positions that may be selected for an absolute position gate, such as director of internal audit absolute position 1331, software engineer of consumer goods absolute position 1332, and regional manager of expert services absolute position 1333.

A person gate specifies an approver based upon the approver's individual identity. Window 1430 in FIG. 14 shows a number of sample people that may be selected for a person gate, including the person Willie Aaron 1431, the person John Abraham 1432, and the person David Ackerman 1433.

Figure 15:
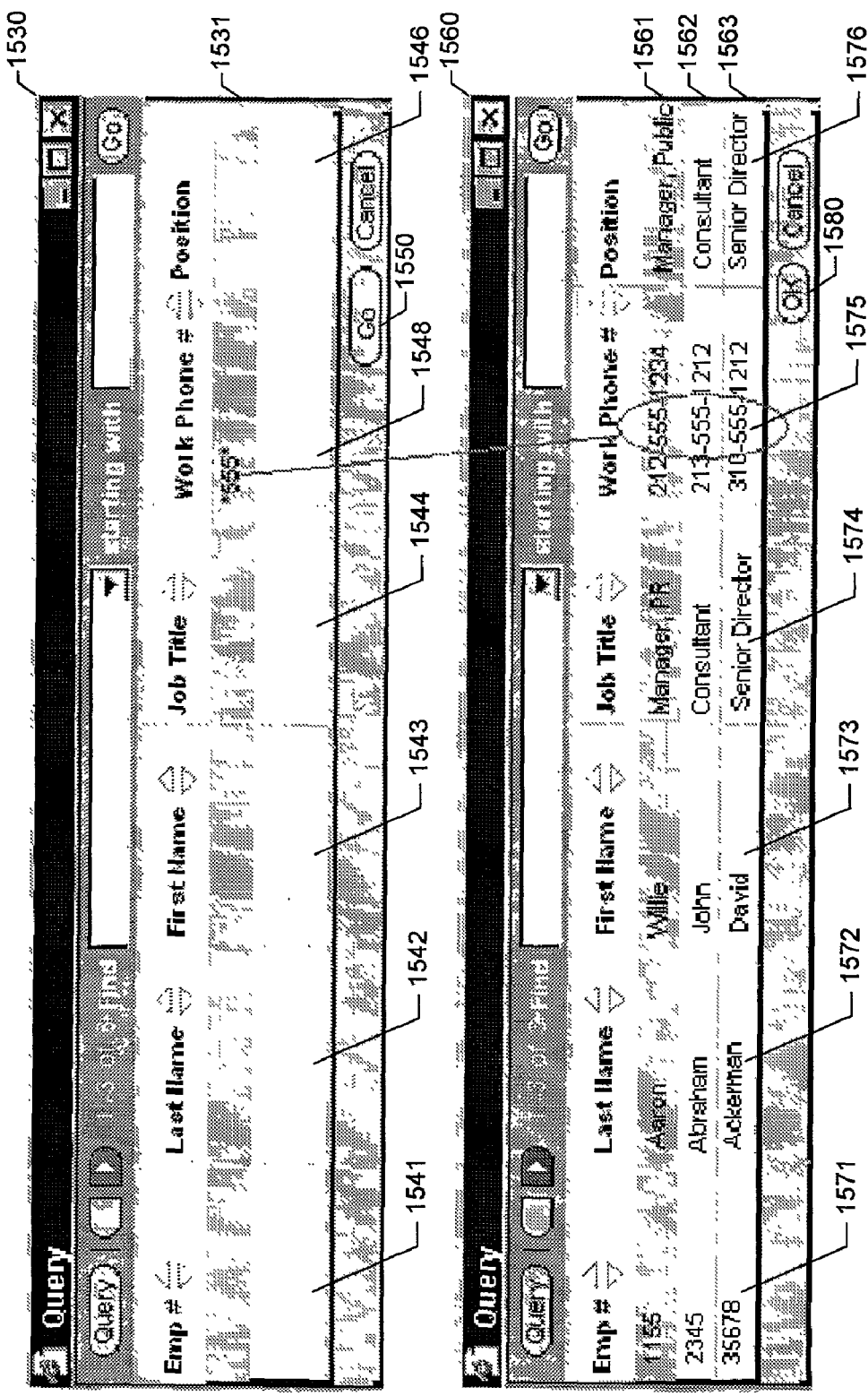

A query gate specifies an approver based upon a database-type query that may be processed when the request is created. Window 1530 in FIG. 15 shows a sample query that may be selected for a query gate. Window 1530 contains a query row 1531 divided into a number of columns 1541–1546, each corresponding to a different employee attribute. The user may type query text into any of these fields in order to specify a query selecting employees whose information matches. In query row 1531, the user has entered the query string "*555*" into field 1548 for work telephone number. As a result, this query selects all employees in whose work phone number the substring "555" appears at any point. Window 1560 shows employees, such as employees 1561–1563, that are selected by this query when the user clicks go button 1550 in window 1530. In some embodiments, the query specified for a query gate is executed during the routing process for a particular request, and its results reflect the contents of employee database at that moment. In these embodiments, the contents of window 1560 are merely advisory, since they correspond to the contents of the employee database at an earlier time. In other embodiments, the query results shown in window 1560 that is generated by executing the query at approval process design time is used to identify the approvers that are specified by the query gate. In this embodiment, the query is not reexecuted as part of routing each request through the defined approval process. In some of these embodiments, the user may modify this list of approvers, such as by adding approvers to or deleting approvers from this list.

Figure 16:
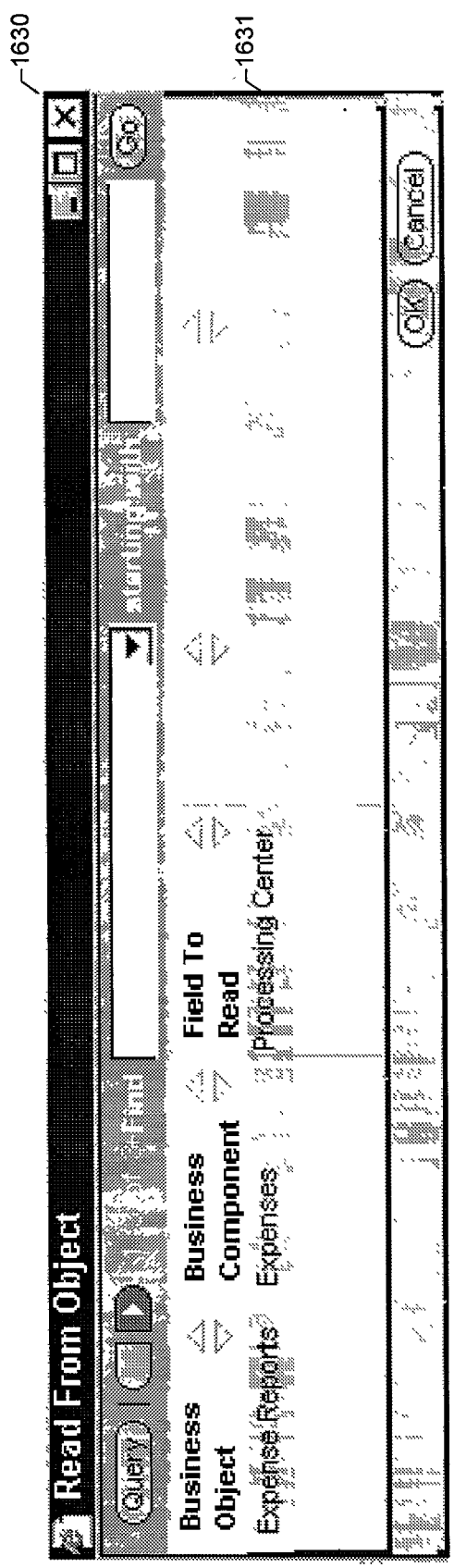

A read from object gate specifies an approver by reading the identity of the approver out of a business object. Window 1630 in FIG. 16 shows sample information 1631 specifying how to read the approver's identity out of a business object. It shows that the identity is to be read from a processing center field residing in an expenses business component of an expense report business object.

Figure 17:
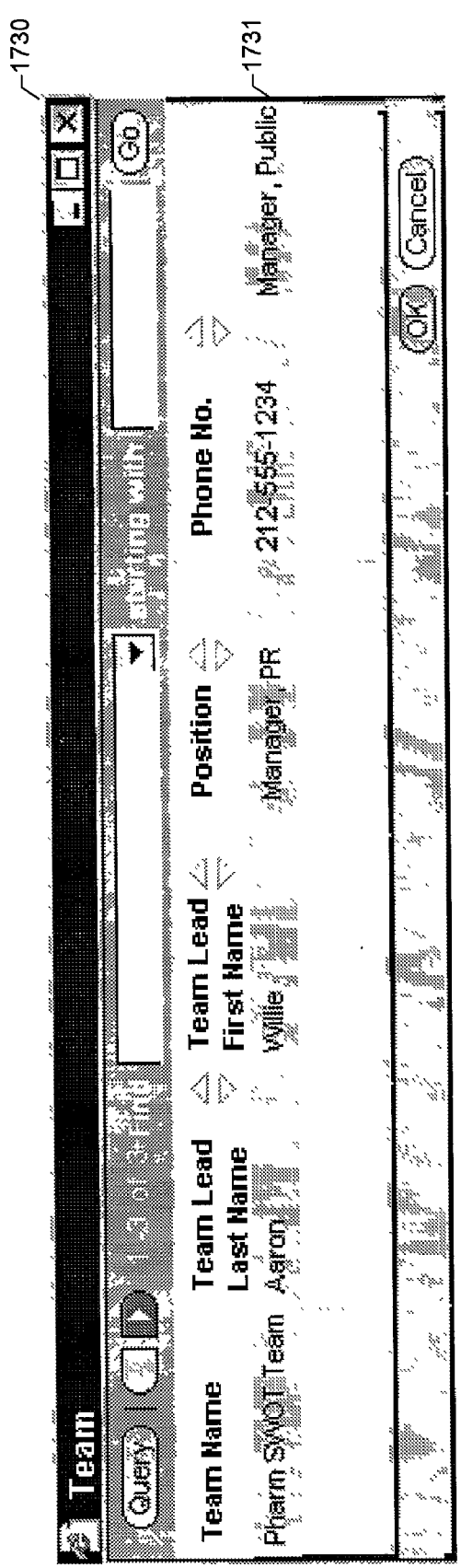
Figure 18:
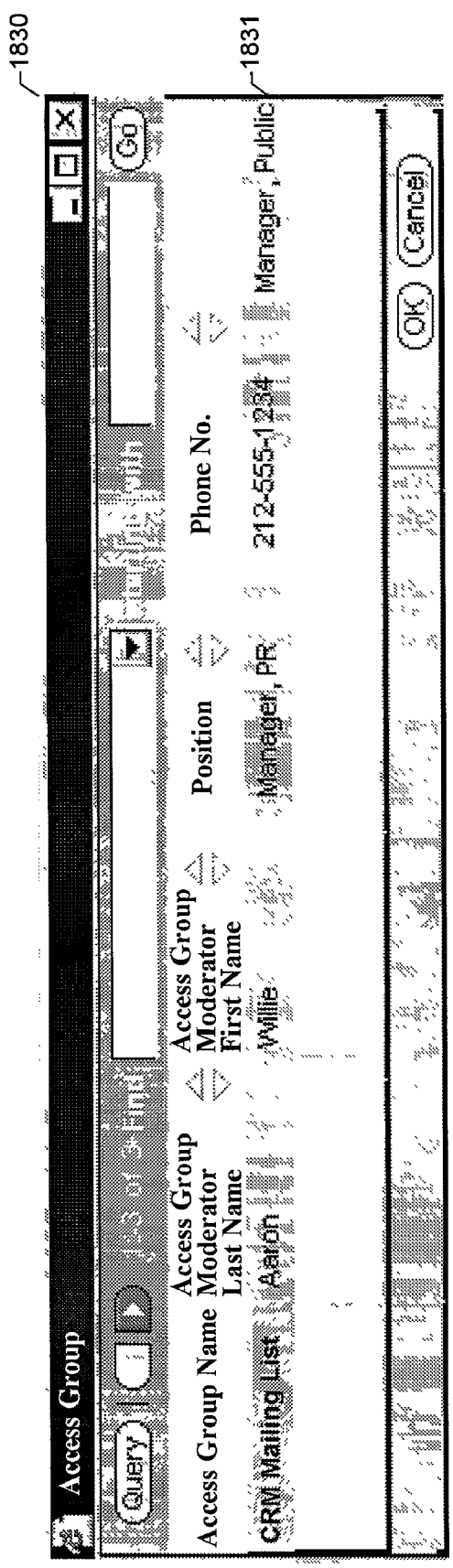

A team gate specifies approvers who are members of a pre-defined team. Window 1730 in FIG. 17 shows a sample team 1731 that may be selected for a team gate.

An access group gate specifies approvers who are members of an access group to which a particular type of information is typically sent. Window 1830 shown in FIG. 18 lists a sample access group 1831 that may be selected for an access group gate.

Figure 19:
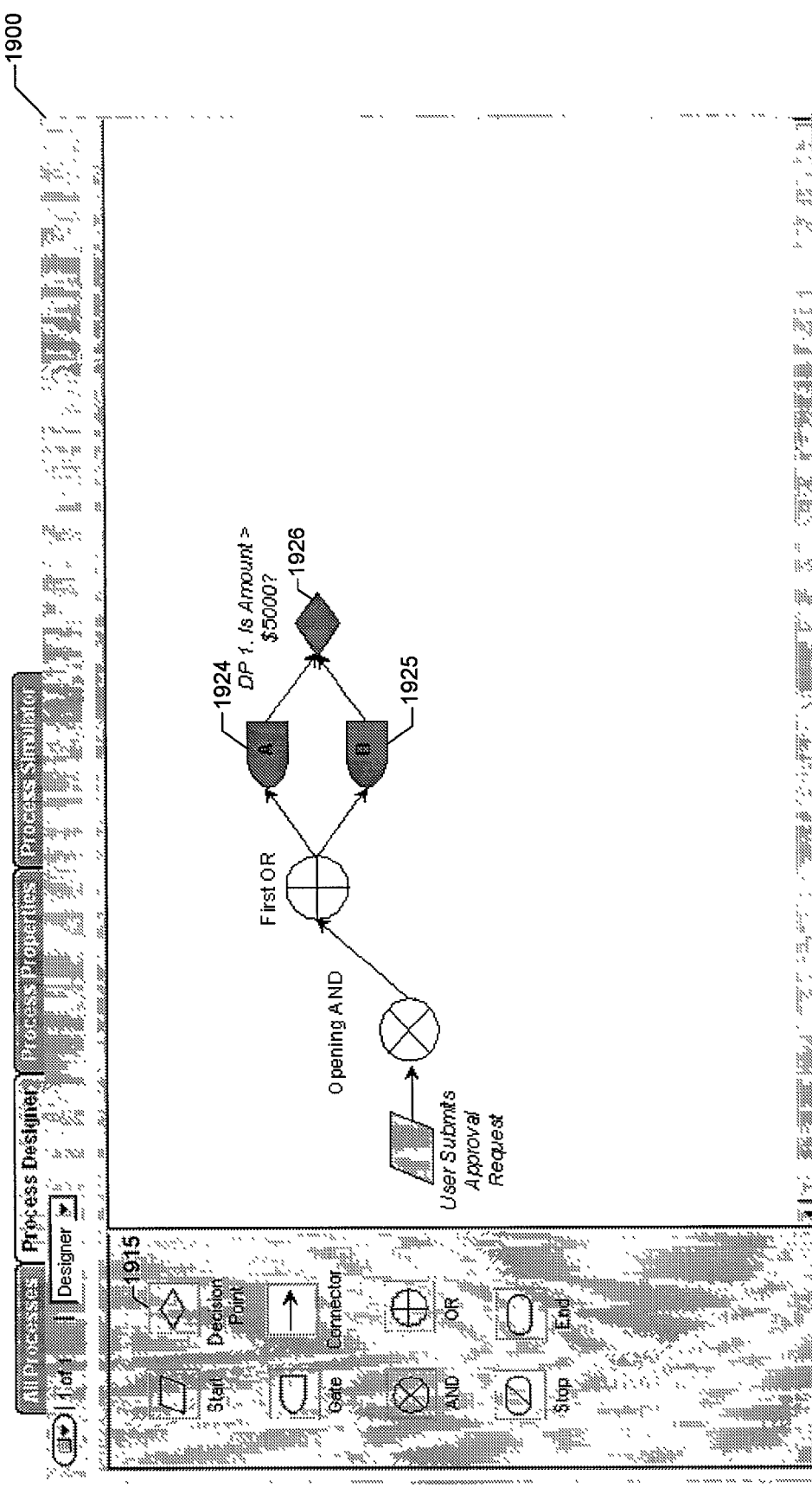
FIG. 19 is a display diagram showing the fifth in a sequence of typical displays depicting the act of defining a request approval process using the facility.

FIG. 19 is a display diagram showing the fifth in a sequence of typical displays depicting the act of defining a request approval process using the facility. FIG. 19 shows the result of dragging icon 1915 into the workspace to create a decision point approval process element instance 1926 in the request approval process being defined. The decision point approval process element branches the approval process into one of two different paths based upon the result of a test: if the test is passed, the approval process follows a Yes branch, while if the test is failed, the approval process follows a No branch.

Figure 20:
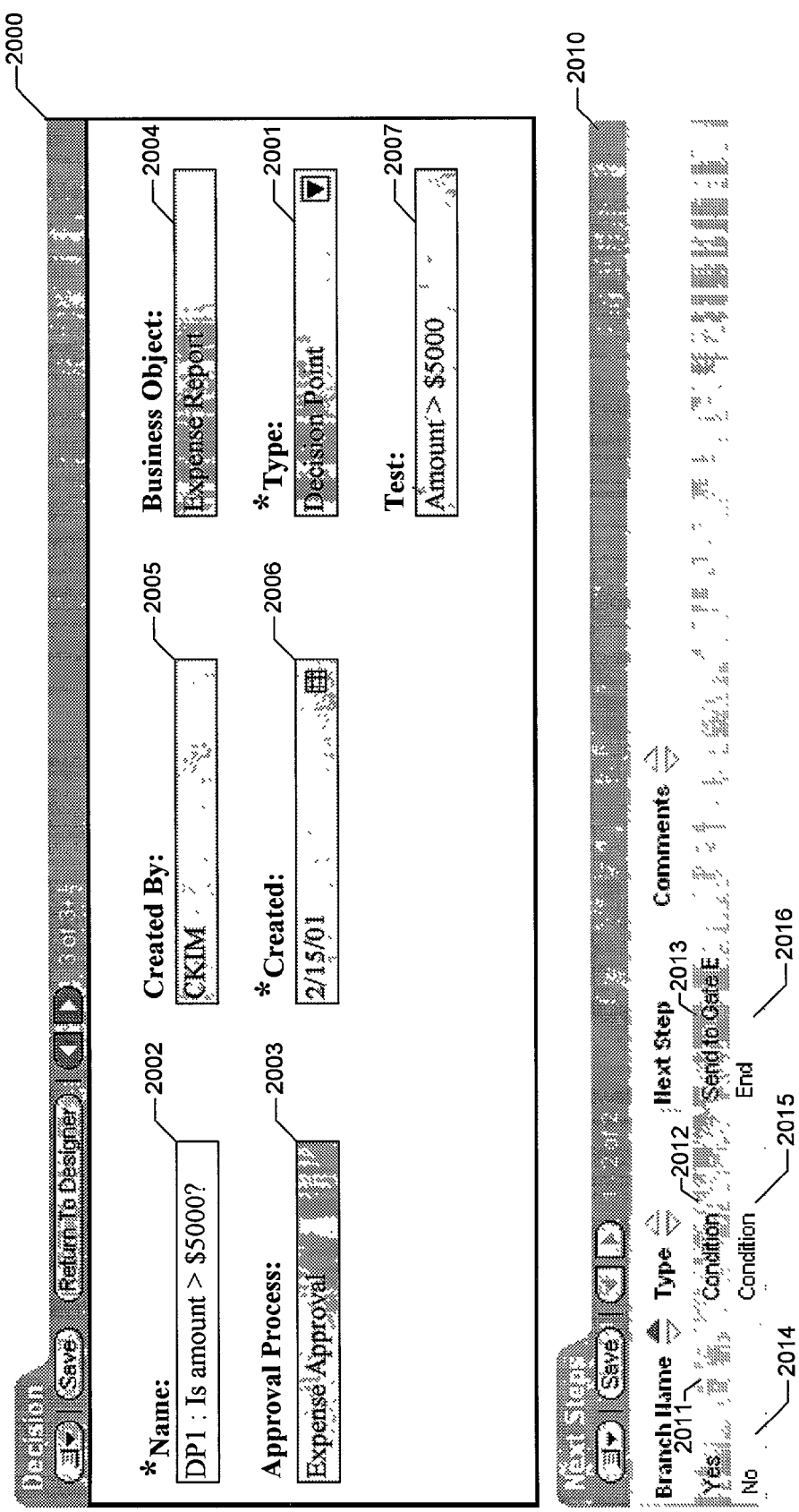
FIG. 20 is a display diagram showing further user interface features of the facility for displaying and/or editing information associated with the decision point approval process element instance whose creation is shown in FIG. 19.

FIG. 20 is a display diagram showing further user interface features of the facility for displaying and/or editing information associated with the decision point approval process element instance whose creation is shown in FIG. 19. Window 2000 shows various attributes of the element instance itself, including a test 2007 that is to be performed at the decision point to determine which branch the approval process is to follow. Here, the test is whether the amount of an expense report exceeds $5,000. Window 2010 contains information describing the subsequent element instances to which the process passes after this element instance. In particular, information items 2011–2013 indicate that, where the test is passed, the process passes to gate E, while information items 2014–2016 indicate that, if the test is failed, the process ends.

Figure 21:
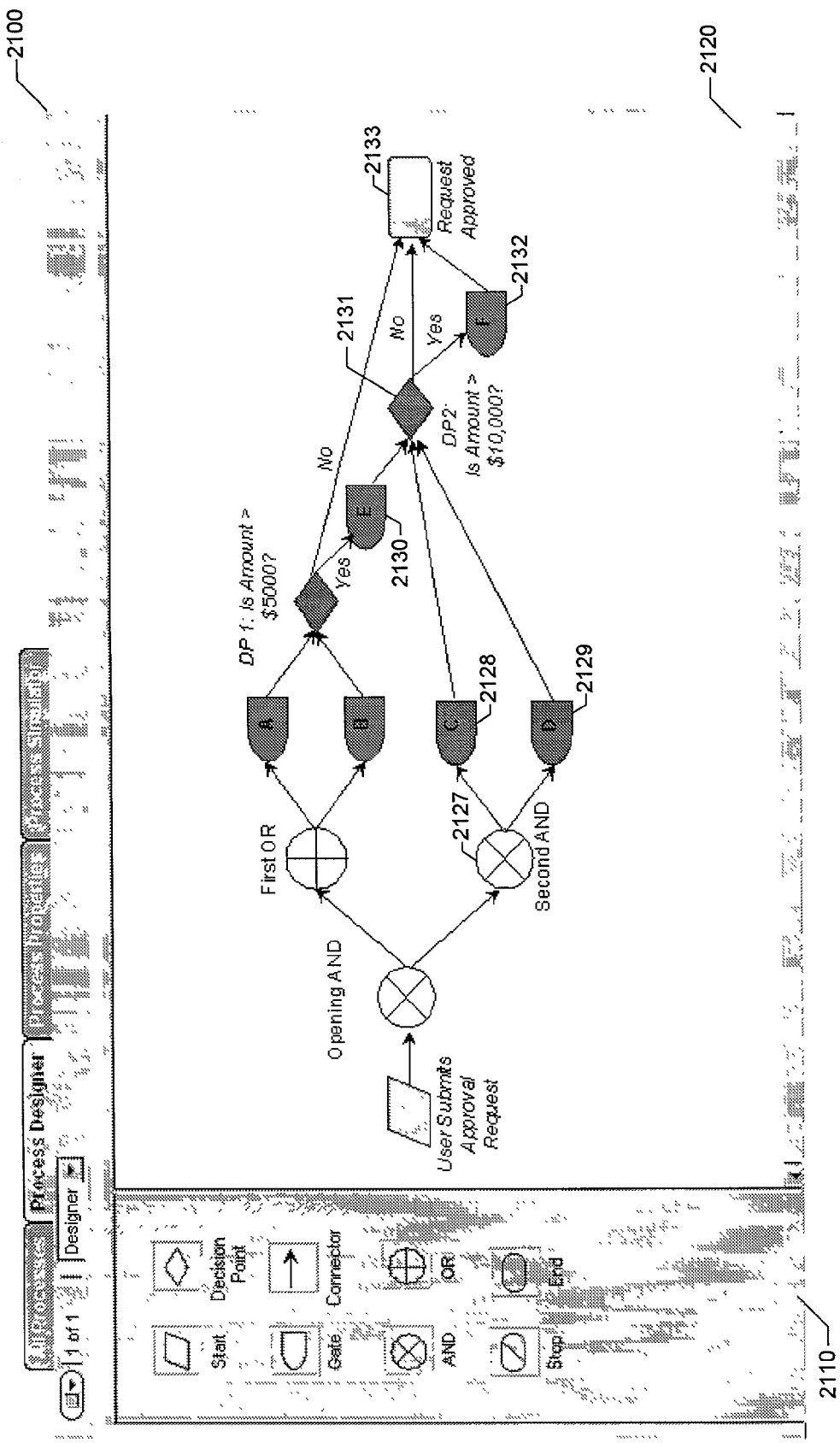
FIG. 21 is a display diagram showing a fully-defined version of the request approval process.

FIG. 21 is a display diagram showing a fully-defined version of the request approval process. It can be seen that additional approval process element instances 2128–2133 have been added by the user by dragging the corresponding icons from the palette 2110 into the workspace 2120. These include an end, or request approved, approval process element instance 2133. If the approval process reaches this element instance, the approval request is considered approved.

At this point, the user may identify the type of approval requests to be processed in accordance with this approval process. The facility then saves this approval process for use in processing each created approval request of this type. In some embodiments, the approval process saved by the facility includes references to one or more of the following: a view of the application that creates approval requests of this type; a class of business objects corresponding to approval requests of this type; and a business service for creating approval requests of this type.

To more fully convey the effect of the fully-defined approval process shown in FIG. 21, it is hereafter described in detail.

A user submits an expense report approval request. This request takes the following route:

The request is sent simultaneously to A, B, C, and D. Two loops follow, one involving A and B, the other involving C and D.

In the first loop, either A or B must approve the request.
  Once one of them approves:
    The approval request automatically disappears from the other's approvals inbox. For example, if B approves, the request disappears from A's approvals inbox.
    If the amount exceeds $5000, the request is sent to E for approval.
    E approves the request. If the loop below is completed and the amount exceeds $10000, the item is sent on to F.
In the other loop, both C and D must approve the request (independently of A and B).
  Once one of them has approved the request, the other person is notified of the first approval.
  Once C & D have both approved the request, and the loop above is completed, the item is sent on to F for approval (if the amount exceeds $10000). F only gets the item when all previous gates have been cleared.
(If amount exceeds $10000) Once F approves the request, the approval process is completed, and the status of the item is "approved."
(If amount is less than $10000) Once both loops are completed, and E has approved if amount exceeds $5000, the approval process is completed, and the status of the request is "approved."

This approval process can be depicted symbolically as follows, where ∪ is the logical symbol for OR and ∩ is the logical symbol for AND, and where A, B, C, D, E, and F represent gates (people/positions/functions) that must approve the item:

[((A∪B)∩E)∩(C∩D))]∩F

Table 1 below shows a number of different intermediate and final resolutions of approval requests subjected to this approval process.

TABLE 1

| | | GATES | | | | | | |
|---|---|---|---|---|---|---|---|---|
| | | A | B | C | D | E | F | Result |
| 1 | decision | approves | approves | approves | approves | approves | approves | APPROVED |
| | status | "acceptable" | "acceptable" | "acceptable" | "acceptable" | "acceptable" | "approved" | |
| | action | delete from B | delete from A | | | | | |

TABLE 1-continued

| | | | | GATES | | | |
|---|---|---|---|---|---|---|---|
| | | A | B | C | D | E | F | Result |
| 2 | decision status action | approves "acceptable" delete from B | rejects "rejected" notify A | approves "acceptable" | approves "acceptable" | approves "acceptable" | approves "acceptable" | APPROVED |
| 3 | decision status action | rejects "rejected" notify B | approves "acceptable" delete from A | approves "acceptable" | approves "acceptable" | approves "acceptable" | approves "approved" | APPROVED |
| 4 | decision status action 1 action 2 | rejects "rejected" notify B notify C & D | rejects "rejected" notify A notify C & D | approves "acceptable" | approves "acceptable" | does not reach N/A | does not reach N/A | REJECTED |
| 5 | decision status action | approves "acceptable" | approves "acceptable" | rejects "rejected" notify A, B, D, E, delete from all unapproved | approves "acceptable" | approves "acceptable" | does not reach N/A | REJECTED |
| 6 | decision status action | approves "acceptable" | approves "acceptable" | approves "acceptable" | rejects "rejected" notify A, B, C, E, delete from all unapproved | approves "acceptable" | does not reach N/A | REJECTED |
| 7 | decision status action | approves "acceptable" | approves "acceptable" | approves "acceptable" | approves "acceptable" | rejects "rejected" notify A, B, C, D, delete from all unapproved | does not reach N/A | REJECTED |
| 8 | decision status action | approves "acceptable" | approves "acceptable" | approves "acceptable" | approves "acceptable" | approves "acceptable" | rejects "rejected" notify A, B, C, D, E | REJECTED |

IV. Conclusion

It will be appreciated by those skilled in the art that the above-described facility may be straightforwardly adapted or extended in various ways. For example, the facility may provide a variety of different approval process elements that diverge from those discussed and shown herein. Additionally, embodiments of the facility may employ any subset or superset of the features discussed herein. While the foregoing description makes reference to preferred embodiments, the scope of the invention is defined solely by the claims that follow and the elements recited therein.

We claim:

1. A method in a computing system for defining a process for approving requests for approval of a selected type, comprising:

displaying a palette containing visual representations of each of a plurality of approval process elements;

receiving a plurality of instances of user input, each instance of user input dragging one of the visual representations into a selected location in a workspace to form an arrangement of approval process elements, at least one of the visual representations being a visual representation of a gate element, the gate element establishing in the arrangement of approval process elements a point at which each request that reaches that point must be approved by at least one of a group of one or more approvers; and storing a process definition corresponding to the formed arrangement of approval process elements.

2. The method of claim 1, further comprising using the stored process definition to process an approval request of the selected type.

3. The method of claim 1, further comprising:

retrieving the stored process definition;

modifying the retrieved process definition; and storing the modified process definition for processing approval requests of a distinguished type, the distinguished type being distinct from the selected type.

4. The method of claim 1 wherein one of the displayed visual representations is a visual representation of a condition element, the condition element branching the approval process for each request that reaches the condition element into one of two alternative paths based upon the value of a condition associated with the condition element.

5. The method of claim 1 wherein one of the displayed visual representations is a visual representation of a conjunction element, the conjunction element splitting the approval process for each request that reaches the conjunction element into both of two separate paths, both of which are pursued simultaneously and both of which must be satisfied for the request to be approved.

6. The method of claim 1 wherein one of the displayed visual representations is a visual representation of a disjunction element, the disjunction element splitting the approval process for each request that reaches the disjunction element into both of two separate paths, the first of which is completed determining whether the request is approved.

7. The method of claim 1 wherein one of the displayed visual representations is a visual representation of an end element, the end element establishing in the approval process a point at which each request that reaches that point is determined to be approved.

8. The method of claim 1 wherein one of the displayed visual representations is a connector, the connector establishing a flow in the approval process from a first approval process element to a second approval process element.

9. A computer-readable medium whose contents cause a computing system to define a process for approving requests for approval of a selected type by:
- displaying a palette containing visual representations of each of a plurality of approval process elements;
- receiving a plurality of instances of user input, each instance of user input dragging one of the visual representations into a selected location in a workspace to form an arrangement of approval process elements, at least one of the visual representations being a visual representation of a gate element, the gate element establishing in the arrangement of approval process elements a point at which each request that reaches that point must be approved by at least one of a group of one or more approvers; and
- storing a process definition corresponding to the formed arrangement of approval process elements.

10. A computing system for defining a process for approving requests for approval of a selected type, comprising:
- a display device that displays a palette containing visual representations of each of a plurality of approval process elements;
- a user input module that receives a plurality of instances of user input, each instance of user input dragging one of the visual representations into a selected location in a workspace to form an arrangement of approval process elements, at least one of the visual representations being a visual representation of a gate element, the gate element establishing in the arrangement of approval process elements a point at which each request that reaches that point must be approved by at least one of a group of one or more approvers; and
- a storage device that stores a process definition corresponding to the formed arrangement of approval process elements.

11. A method in a computing system for defining a process for approving approval requests of a first type, comprising:
- retrieving a process definition stored for approving approval requests of a second type that is distinct from the first type;
- displaying a pictorial representation of the retrieved process definition;
- receiving user input modifying the displayed pictorial representation, wherein the modifying involves a gate element, the gate element establishing in the process definition a point at which each request that reaches that point must be approved by at least one of a group of one or more approvers; and
- storing a process definition corresponding to the modified pictorial representation, the stored process definition defining a process for approving approval requests of the first type while preserving the process definition for approving approval requests of the second type.

12. The method of claim 11 wherein the approval requests of the first type are generated using a first application, and wherein approval requests of the second type are generated using a second application distinct from the first application.

13. The method of claim 11 wherein the stored process definition identifies a view of the underlying application in which details about approval requests of the first type may be displayed.

14. The method of claim 11 wherein the stored process definition identifies a class of business objects corresponding to approval requests of the first type.

15. The method of claim 11 wherein the stored process definition identifies a business service for creating approval requests of the first type.

\* \* \* \* \*